Oct. 6, 1959  C. R. DE WEESE ET AL  2,907,320
PRESSURE CAPACITANCE TRANSDUCER
Filed Jan. 11, 1954  3 Sheets-Sheet 1

INVENTORS
Charles R. DeWeese and
Robert W. Olson
BY Stevens, Davis, Miller and Mosher
ATTORNEYS Oct. 6, 1959 C. R. DE WEESE ET AL 2,907,320
PRESSURE CAPACITANCE TRANSDUCER
Filed Jan. 11, 1954 3 Sheets-Sheet 2
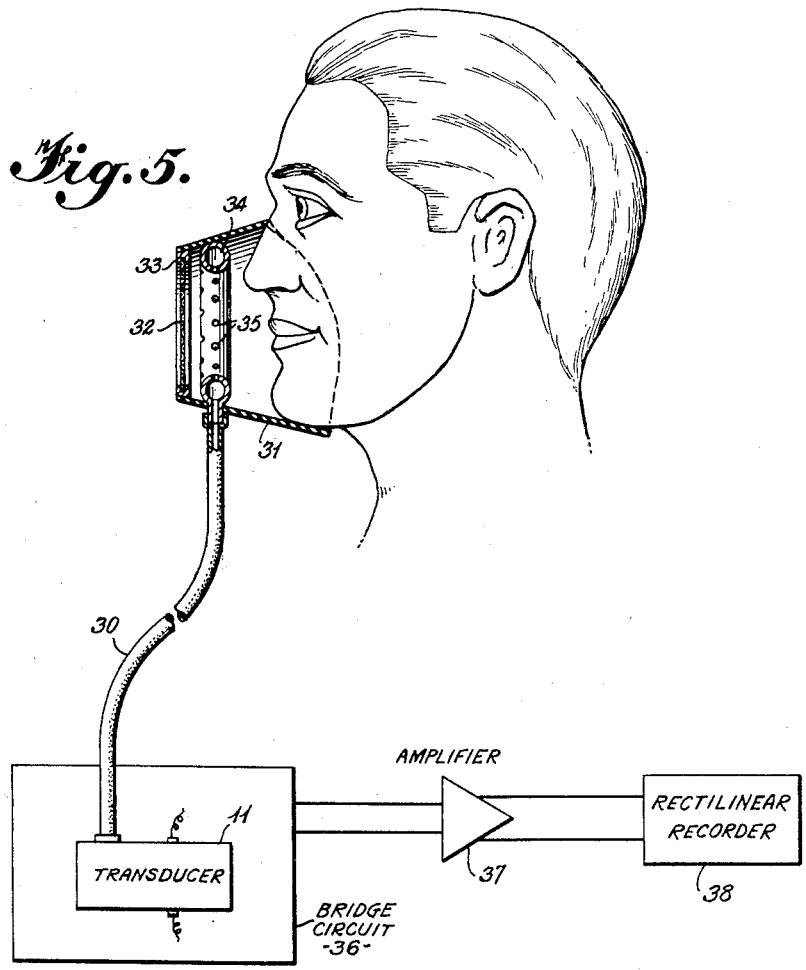
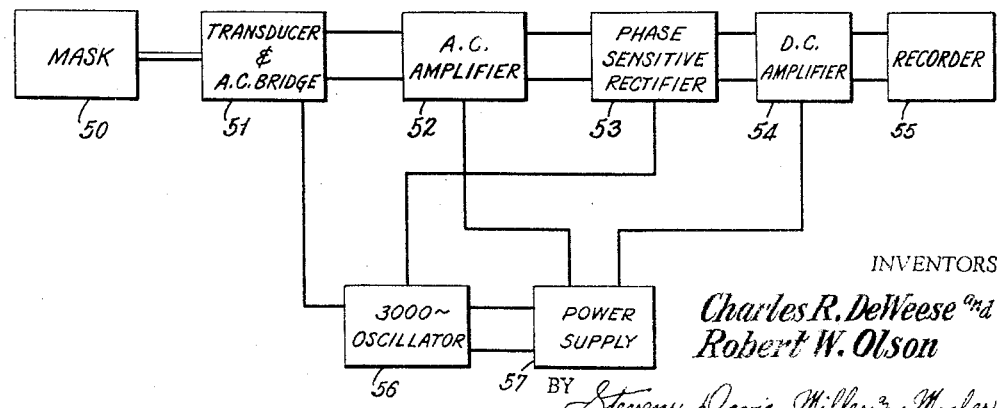
INVENTORS
*Charles R. DeWeese* and
*Robert W. Olson*
BY *Stevens, Davis, Miller and Mosher*
ATTORNEYS

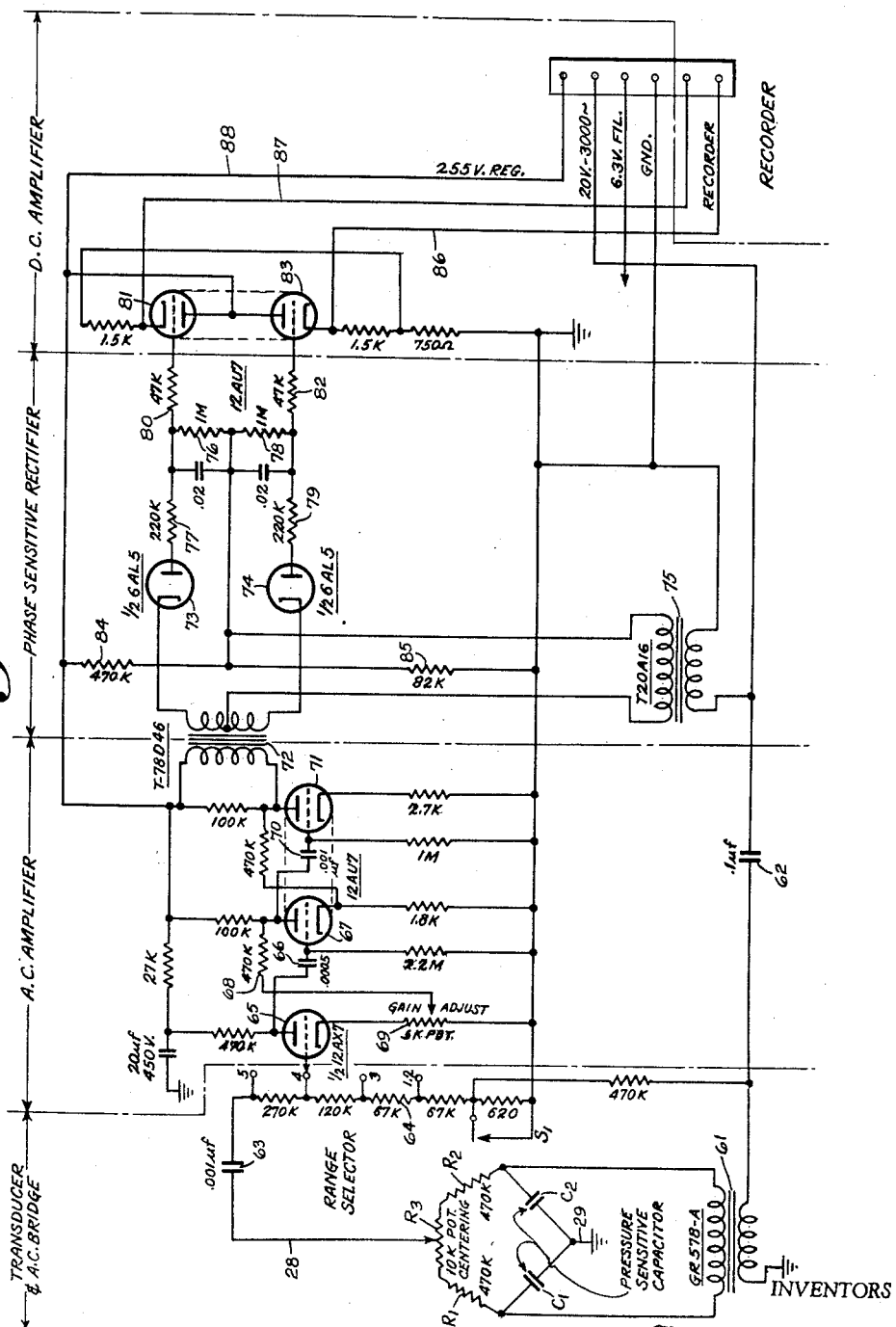

United States Patent Office 2,907,320
Patented Oct. 6, 1959

2,907,320

PRESSURE CAPACITANCE TRANSDUCER

Charles R. De Weese and Robert W. Olson, Dallas County, Tex., assignors to Texas Instruments Incorporated, Dallas, Tex., a corporation of Delaware Application January 11, 1954, Serial No. 403,375

10 Claims. (Cl. 128—2)

This invention relates to a pressure sensitive transducer of the capacitance type and to a pneumotachograph apparatus employing said pressure sensitive transducer.

It is a major object of the present invention to provide an improved pressure sensitive transducer which will be characterized by the ability to give output responses which linearly vary with pressure and to make full use of such characteristic in a novel pneumotachograph apparatus.

It is a further object of this invention to supply a pneumotachograph apparatus which will operate more efficiently to perform its intended functions than apparatuses heretofore advanced for this purpose.

It is another object of the present invention to provide a pressure sensitive transducer of the capacitance type which will be simpler to construct, easier to assemble, and more accurately adjusted than transducers heretofore available.

It is a further object of the present invention to provide a pressure sensitive transducer of the capacitance type which can be duplicated and assembled with the use of standard, inexpensive tools whereby to bring about economy and efficiency in its production.

Other objects and advantages of the present invention will become apparent from a detailed consideration of the following description when taken in conjunction with the drawings in which:

Figure 5 is a schematic representation showing an oral-nasal mask connected to the transducer;

Figure 6 is a block diagram representing the pneumotachograph apparatus; and

Figure 7 is a circuit diagram showing the details of the bridge, A.C. amplifier, phase sensitive rectifier, and D.C. amplifier.

Figure 1:
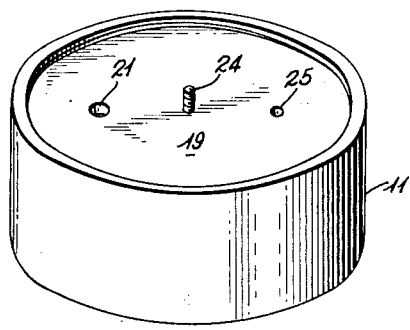
Figure 1 is a view in perspective of the transducer of the present invention.
Figure 2:
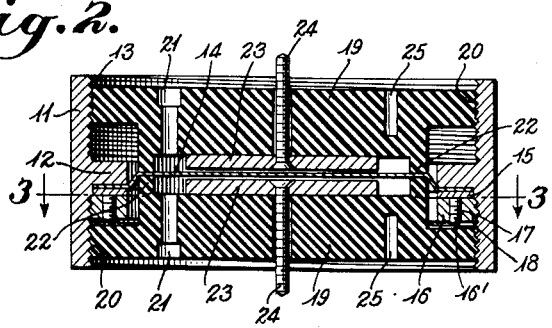
Figure 2 is a view in vertical section of Figure 1 taken along line 2—2.
Figure 3:
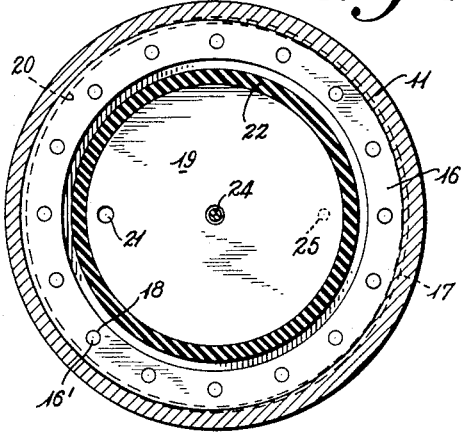
Figure 3 is a view in horizontal section of Figure 2 taken along line 3—3.

Referring now to the drawings, the transducer is depicted in Figures 1 to 3 inclusive. The transducers consists of an outside support ring 11 which forms the chief support structure for containing and assembling the remaining components of the pressure sensitive transducer. Outside support ring 11 is machined from a brass ring with the required outside diameter, length, and wall thickness. The exterior surface of ring support 11 has a smooth, finished surface but the interior is machined and tapped to form diaphragm support shoulder 12 and threads 13. The internal threads 13 are formed as right-hand threads beginning at either end of ring 11 and lead inward towards the mid-point of the ring. Diaphragm support shoulder 12 is located equidistant from either end of support ring 11 and, therefore, at the mid-point of the support ring.

The first component to be placed in position inside support ring 11 is diaphragm 14. Diaphragm 14 is cut from a sheet of beryllium copper, a few thousandths of an inch in thickness, with a diameter approximately equal to the internal diameter of support ring 11 measured between opposite points on the crown of threads 13. Therefore, diaphragm 14 rests against diaphragm support shoulder 12 which extends inward from the sides of support ring 11. It is immaterial upon which side of shoulder 12 that the diaphragm is placed since the support ring is symmetrical.

The next component to be placed in position is brass bearing ring 15. The diameter of ring 15 is slightly less than the crown thread diameter so that it moves freely into position with diaphragm 14 between it and the shoulder 12. Brass clamp ring 16 is formed with threads 17 around its outside diameter and is also drilled and tapped with any given number of equally spaced holes 18. Clamp ring 16 is threaded into support ring 11 and tightened to hand tightness against bearing ring 15. Set screws 16' are then inserted into the threaded holes 18 and tightened against bearing ring 15 to firmly secure diaphragm 14 in place between bearing ring 15 and shoulder 12. The pressure exerted against bearing ring 15 by the set screws is balanced by the threaded connection 17 with the support ring.

The next components to be placed into the support ring are two capacitor supports, formed of some suitable insulating material. Each capacitor support 19 is threaded externally with threads 20 to match threads 13 of the support ring 11. It is apparent that due to the diaphragm 14, bearing ring 15, and clamp ring 16, clearance must be provided if capacitor support 19 is to be threaded into position. Therefore, the capacitor support 19 is turned down to a diameter sufficient to clear the inside diameters of rings 15 and 16 and to a depth which is greater than the combined thickness of diaphragm 14, ring 15, and ring 16. The capacitor support 19 is then countersunk along the flat circular side of the turned down diameter to provide a circular recessed area for containing capacitor plate 23.

Since the countersunk area has a smaller diameter than the diameter turned down to clear the bearing and clamp rings, a flat ring shoulder 22 is formed. The capacitor plate 23 has a thickness less than the depth of the countersunk area defined by ring shoulder 22. The difference between the thickness of capacitor plate 23 and the depth of the countersunk area provides a slight but accurately determined clearance between the bottom surface of the capacitor plate and a straight line between the flat ends of shoulder 22. Flat headed bolt 24 secures each capacitor plate 23 to its respective capacitor support 19 and serves as the electrical connection to a bridge circuit. Hole 21, drilled through capacitor support 19, opens the countersunk area to pressure variations. Another hole 25 is drilled partly through capacitor support 19 so that a spanner type wrench inserted in hole 25 can be used to tighten the capacitor support into position in support ring 11.

In completing the transducer assembly, the first capacitor support to be put into support ring 11 is on the same side of diaphragm support shoulder 12 as bearing ring 15 and clamp ring 16. As the capacitor support 19 is threaded into the support ring, ring shoulder 22 contacts diaphragm 14 and carries it inward to almost the exact center of the diaphragm support shoulder 12. Thus, diaphragm 14 is stretched very tightly across the ring shoulder 22 at all points around the circumference of the ring. The other capacitor support 19 is then threaded into the support ring 11 and tightened until its shoulder 22 contacts shoulder 22 of the capacitor support already in place. Diaphragm 14 is therefore positioned between the two condenser plates 23 and separated equidistant from each. The construction of the transducer makes it possible to accurately fix the diaphragm equidistant from each condenser plate because of the use of symmetrical components.

Figure 4:
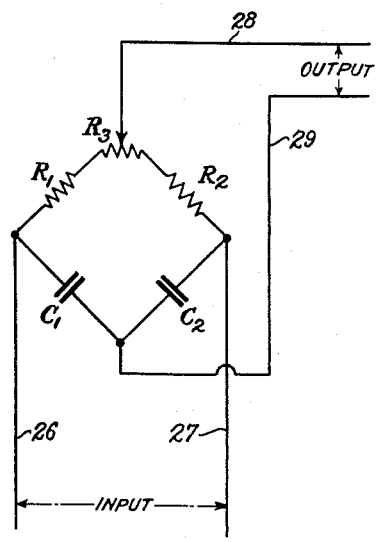
Figure 4 is a schematic representation showing the balanced bridge circuit.

Figure 4 illustrates a typical bridge circuit in which the pressure sensitive transducer can be used. The transducer is represented in the diagram as condenser $C_1$ and condenser $C_2$ and forms two arms of the bridge circuit. The input to the circuit is applied through leads 26 and 27 from some source such as a transformer. The leads are connected to the terminals 24 which extend through the condenser plate and capacitor support to the exterior of the transducer. Resistances $R_1$ and $R_2$ of equal value also connect onto these terminals and provide the other two arms for the bridge circuit. A resistance $R_3$ is connected between resistances $R_1$ and $R_2$ and serves merely as a convenient means for adjusting the output of the circuit to zero when the diaphragm is acted upon by equal pressures. Lead 28 is connected to the adjusted position on resistance $R_3$, which is between resistances $R_1$ and $R_2$, and lead 29 is connected between condenser $C_1$ and condenser $C_2$. Leads 28 and 29 deliver the output of the circuit to amplifier stages to provide the operating signal for a recorder.

According to conventional bridge circuit theory, when $$\frac{C_1}{C_2} = \frac{R_1}{R_2}$$

the bridge is balanced and there will be no difference in potential between leads 28 and 29 although there is a large potential difference between leads 26 and 27. But, suppose a pressure drop moves diaphragm 14 closer to condenser $C_2$ and increases its capacitance and at the same time decreases the capacitance of condenser $C_1$. In this case, the voltage drop through $C_2$ will be less than the voltage drop through $R_2$ and there will be a potential difference between leads 28 and 29. Since the points of connection of lead 26 and the mid-point between $R_1$ and $R_2$ are both positive with respect to leads 27 and 29, there is no polarity reversal between leads 28 and 29. If, however, the pressure increases so that diaphragm 14 is moved closer to condenser plate $C_1$, the capacity of $C_1$ increases and at the same time the capacity of condenser $C_2$ decreases. The voltage drop through $C_2$ in this case will be greater than the drop through $R_2$ and the bridge will be unbalanced, but the polarity will be reversed from that in which the unbalance was caused by an increase in the capacitance of $C_2$ at the expense of the capacitance of $C_1$. Thus, the connection between $C_1$ and $C_2$ is positive with respect to the connection between $R_1$ and $R_2$ and lead 26 is positive with respect to lead 27, so the voltage drop is from lead 29 to 28. With such an arrangement, it is possible to record both positive and negative signals in which the unbalance of the bridge is directly related to the pressure differential applied across the transducer diaphragm.

An oral-nasal mask connected to the pressure sensitive transducer is shown in Figure 5. As shown, one side of the diaphragm of the transducer is directly open to atmospheric pressure while the other side of the diaphragm is indirectly open to atmospheric pressure. The side of the diaphragm which is open to the atmosphere, indirectly communicates with a tube 30 inserted into the enlarged portion of hole 21 which tube leads to an oral-nasal mask 31. As part of the oral-nasal mask, a fine wire, 400 mesh screen 32 is supported in an orifice plate 33. The 400 mesh screen has the characteristic of producing a linear pressure drop with flow and has proved to be the most satisfactory screen for this purpose, although screens with a different mesh can be used. A manifold 34 is located on the inside of the screen 32 and around the orifice plate 33 and it is to this manifold specifically that the tube 30 from the pressure sensitive transducer is connected. The pressure drop or pressure increase across the screen, depending upon whether the subject is inhaling or exhaling, is transmitted through a series of equally spaced holes 35 around the manifold to the tube and thus to one side of the diaphragm. The diaphragm is then moved by the pressure drop or pressure increase across the screen; that is, one side of the diaphragm is subject to atmospheric pressure, while the other side of the diaphragm is subject to atmospheric pressure plus or minus the pressure drop created by the screen located in the oral-nasal mask. As the diaphragm moves in either direction from the center position, the capacitance of one condenser plate is increased and at the same time the capacitance of the other plate is decreased.

In Figures 6 and 7 there is shown a block diagram of the pneumotachograph together with a legend and the electrical details of the amplifier-detector circuit. The function of the pneumotachograph apparatus is to check the volume of air taken into and expelled from a person's lungs. As a person (or an animal) breathes into the oral-nasal mask 50 of Figure 6, the flow of air produces a linear pressure drop across the fine wire screen positioned in the mask as was discussed with reference to Figure 5. This pressure drop is fed to one side of the diaphragm of the transducer 51 which is located in and forms two arms of an A.C. bridge circuit (also designated by the numeral 51 in Figure 6). As the diaphragm deflects in accordance with pressure drops across the screen of the mask, the capacitance between the plates of the transducer is unbalanced, and this results in an output signal from the bridge circuit. The signal from the bridge is amplified in an A.C. amplifier 52 and then fed to a phase sensitive rectifier 53. At this point, the phase change between the pressure drop on inhalation and exhalation is detected and the A.C. signal is converted into D.C. current of the appropriate polarity. This D.C. current is amplified in the D.C. amplifier 54 to a power level sufficient to operate the rectilinear recorder 55. The recorder is arranged to deflect to either side of the chart center line in accordance with the polarity of the D.C. signal. Hence, a recording is made of the volume of air taken into and expelled from the person's lungs. As shown in Figure 6, an oscillator 56 and power supply 57 are provided.

With reference to the circuit diagram shown in Figure 7, a 20 volt, 3000 cycle signal from the oscillator is fed to the primary winding of a step up transformer 61 through a capacitor 62. The stepped up voltage induced on the secondary of the transformer 61 is applied to the bridge circuit, which is described with reference to Figure 4. The output signal from the bridge is applied to the A.C. amplifier over lead 28 through a capacitor 63 and a range selector voltage divider 64. The output lead 29 is grounded. Any one of the output taps from the voltage divider may be selectively connected to the grid of a tube 65, which provides the first stage of amplification in the A.C. amplifier. The amplified signal which results on the plate of the tube 65 is fed through capacitor 66 to the grid of the tube 67 which provides the second stage of amplification in the A.C. amplifier. The resulting amplified signal on the plate of the tube 67 is fed back through a resistor 68 to the adjustable tap on a resistor 69 in the cathode circuit of the tube 65. The position of the adjustable tap determines the amount of negative feedback to the tube 65 and thereby the gain through the first two stages. The signal on the plate of the tube 67 is also fed through the capacitor 70 to the grid of the tube 71, which provides the third stage of amplification of the three stage A.C. amplifier. The plate of the tube 71 is connected to the cathode of the tube 67 over resistor 72 to provide negative feedback of the amplified signal on the plate of the tube 71 to the tube 67. The signal on the plate of the tube 71 is fed to the primary of the transformer 72. The secondary of the transformer is connected into a phase sensitive rectifier. The phase sensitive rectifier comprises two rectifying diodes 73 and 74 each one connected to a separate end of the secondary winding of the transformer 72. The 3000 cycle signal from the oscillator is applied to the primary winding of a transformer 75. One end of the secondary of the transformer 75 is connected to a mid tap on the secondary winding of the transformer 72. The other end of the secondary transformer 75 is connected to the diode 73 through resistors 76 and 77 and to the diode 74 through resistors 78 and 79. The amplitude and polarity of the rectified signal produced across resistors 76 and 78 will depend upon the phase relationship between the signal induced in the secondary of the transformer 75 and the signal induced in the secondary of the transformer 72. This D.C. signal is fed from the junction of resistors 76 and 77 over resistor 80 to the grid of a tube 81 and from the junction of the resistors 78 and 79 over resistor 82 to the grid of a tube 83. The resistors 84 and 85 are connected to the junction of resistors 76 and 78 and provide a reference bias for the grids of the tubes 81 and 83. The tubes 81 and 83 are connected as cathode followers. The leads 86 and 87 from the cathodes of tubes 81 and 83 provide a bipolar signal which the leads 86 and 87 feed to the recorder. A 255 volt D.C. power supply is provided over lead 88 to the A.C. amplifier and to the biasing resistors 84 and 85.

Although the present invention has been shown and described with reference to particular embodiments, nevertheless various changes and modifications obvious to one skilled in the art are within the spirit, scope and contemplation of the present invention.

What is claimed is:

1. A pressure sensitive transducer of the capacitance type comprising a support ring provided with an internal shoulder between its ends, a resilient diaphragm resting against one side of said shoulder, means holding said diaphragm against said shoulder, a pair of capacitor plate supports mounted in said support ring on opposite sides of said diaphragm, a capacitor plate fixed onto each said support, said capacitor plate supports defining shoulders which symmetrically abut on opposite sides of said diaphragm to fix said diaphragm equidistant from said capacitor plates when in a state of repose and to define air gaps between said diaphragm and said capacitor plates, and means defined by said transducer for communicating pressure to said air gaps whereby to cause a deflection of said diaphragm toward one of said capacitor plates upon a pressure differential existing across said diaphragm.

2. A pressure sensitive transducer as defined in claim 1 wherein said means holding said diaphragm against said shoulder includes a clamp ring mounted in said support ring.

3. A pressure sensitive transducer of the capacitance type comprising a support ring provided with an internal shoulder midway between its ends, a resilient diaphragm resting against one side of said shoulder, a bearing ring resting against said diaphragm, a clamp ring mounted within said support ring and holding said bearing ring and said diaphragm against said shoulder, a pair of capacitor plate supports mounted in said diaphragm, a capacitor plate fixed to each of said plate supports, an electrode attached to each of said capacitor plates projecting through its respective capacitor plate support, shoulders defined by said capacitor plate supports symmetrically abutting on opposite sides of said diaphragm to fix said diaphragm equidistant from said capacitor plates when in a state of repose and to define air gaps between said diaphragm and said capacitor plates, and bores defined by said capacitor plate supports for communicating pressure to said air gaps whereby to cause a deflection of said diaphragm toward one of said capacitor plates upon a pressure differential existing across said diaphragm.

4. Pneumotachograph apparatus comprising an oral-nasal mask including means having the characteristic of producing a pressure drop with flow therethrough, a pressure sensitive transducer, a tube connecting the space in said mask with said transducer, means communicating ambient pressure to said transducer, a balanced bridge circuit in which said transducer constitutes two arms thereof, input leads adapted to furnish electrical energy to said bridge, amplifying means, output leads connecting said bridge and said amplifying means, and a recorder connected to said amplifying means adapted to produce a record of pressure drops resulting from flow through said mask.

5. Pneumotachograph apparatus as defined in claim 4 wherein said oral-nasal mask includes orifice means adapted to produce a pressure drop with flow therethrough.

6. Pneumotachograph apparatus comprising an oral-nasal mask including an orifice plate and a screen supported thereby having the characteristic of producing a pressure drop with flow therethrough, a pressure sensitive transducer of the capacitance type having a diaphragm interposed between a pair of capacitor plates to define a pair of air gaps, a tube connecting the space in said mask with one of said air gaps, means defined by said transducer to communicate ambient pressure to the other of said air gaps, a balanced bridge circuit in which said transducer constitutes two arms thereof, input leads adapted to furnish electrical energy to said bridge, amplifying means, output leads connecting said bridge and said amplifying means, and a rectilinear recorder connected to said amplifying means adapted to produce a rectilinear record of pressure differences across said screen.

7. Pneumotachograph apparatus comprising an oral-nasal mask including an orifice plate, a screen supported thereby having the characteristic of producing pressure drop with flow therethrough, and a manifold surrounding said screen on the inside of said mask having a plurality of holes, a pressure sensitive transducer of the capacitance type having a diaphragm interposed between a pair of capacitor plates to define a pair of air gaps, a tube connecting said manifold with one of said air gaps, means defined by said transducer to communicate ambient pressure to the other of said air gaps, a balanced bridge circuit in which said transducer constitutes two arms thereof, input leads adapted to furnish electrical energy to said bridge, amplifying means, output leads connecting said bridge and said amplifying means, and a rectilinear recorder connected to said amplifying means adapted to produce a rectilinear record of pressure differences across said screen.

8. Pneumotachograph apparatus as defined in claim 7 wherein said screen is composed of fine wire and is of 400 mesh thus having the characteristic of producing a linear pressure drop with flow therethrough.

9. Flow indicating apparatus comprising means having the characteristic of producing a pressure drop with flow therethrough, a pressure sensitive transducer, means applying the pressure differential from said pressure drop means across said transducer, a balanced bridge circuit in which said transducer constitutes two arms thereof, input leads adapted to furnish electrical energy to said bridge, amplifying means, output leads connecting said bridge and said amplifying means and an indicator connected to said amplifying means adapted to produce an indication of flow through said pressure drop means.

10. Flow recording apparatus comprising means having the characteristic of producing a pressure drop with flow therethrough, a pressure sensitive transducer, means applying the pressure differential from said pressure drop means across said transducer, a balanced bridge circuit in which said transducer constitutes two arms thereof, input leads adapted to furnish electrical energy to said bridge, amplifying means, output leads connecting said bridge and said amplifying means and a recorder connected to said amplifying means adapted to produce a record of flow through said pressure drop means.

References Cited in the file of this patent

UNITED STATES PATENTS

| | | |
|---|---|---|
| 2,092,762 | Korger | Sept. 14, 1937 |
| 2,431,328 | Hull | Nov. 25, 1947 |
| 2,487,083 | Warshaw | Nov. 8, 1949 |
| 2,667,786 | Spaulding | Feb. 2, 1954 |
| 2,753,515 | Rickner | July 3, 1956 |
| 2,770,703 | Scheurich | Nov. 13, 1956 |